United States Patent [19]
Adair et al.

[11] Patent Number: 5,882,388
[45] Date of Patent: Mar. 16, 1999

[54] WATER RESISTANT INK JET RECORDING MEDIA TOPCOATS

[75] Inventors: Paul C. Adair, Germantown; Bruce M. Klemann, Shorewood; Mary J. Janicek, Bayside, all of Wis.

[73] Assignee: Brady USA, Inc., Milwaukee, Wis.

[21] Appl. No.: 730,287

[22] Filed: Oct. 16, 1996

[51] Int. Cl.$^6$ .................................................. B32B 9/00
[52] U.S. Cl. .................. 106/31.6; 106/31.65; 106/31.67; 106/499; 106/491; 347/105; 428/320.2; 428/340; 427/288
[58] Field of Search ............................... 106/31.6, 31.65, 106/31.67, 499, 491; 347/105; 428/320.2, 340; 427/288

[56] References Cited

U.S. PATENT DOCUMENTS

| | | | |
|---|---|---|---|
| Re. 28,533 | 8/1975 | Drawert et al. | 260/404.5 |
| 2,252,554 | 8/1941 | Karothers | 260/78 |
| 2,285,009 | 6/1942 | Brubaker et al. | 260/78 |
| 2,320,088 | 5/1943 | Leekley | 260/29 |
| 2,388,035 | 10/1945 | Frosch | 260/72 |
| 2,393,972 | 2/1946 | Cairns | 18/54 |
| 2,450,940 | 10/1948 | Cowan et al. | 260/404.5 |
| 3,157,681 | 11/1964 | Fischer | 260/407 |
| 3,256,304 | 6/1966 | Fischer et al. | 260/407 |
| 3,258,433 | 6/1966 | Cantor et al. | 260/29.6 |
| 3,380,844 | 4/1968 | Menikheim et al. | 117/47 |
| 3,394,029 | 7/1968 | MacArthur | 117/138.8 |
| 3,501,269 | 3/1970 | Winyall et al. | 23/182 |
| 3,579,485 | 5/1971 | Folzenlogen et al. | 260/78.4 D |
| 3,637,550 | 1/1972 | Sprauer | 260/18 |
| 3,931,087 | 1/1976 | Baatz et al. | 260/29.6 SQ |
| 3,959,174 | 5/1976 | Winyall et al. | 252/317 |
| 4,012,560 | 3/1977 | Baatz et al. | 428/474 |
| 4,014,645 | 3/1977 | Chancier et al. | 8/7 |
| 4,070,421 | 1/1978 | Etter, Jr. | 260/897 C |
| 4,080,405 | 3/1978 | Agouri et al. | 360/878 R |
| 4,097,677 | 6/1978 | Emmons et al. | 560/220 |
| 4,254,009 | 3/1981 | Dittrich et al. | 260/40 R |
| 4,314,933 | 2/1982 | Berner | 260/45.75 N |
| 4,442,172 | 4/1984 | Oshima et al. | 428/342 |
| 4,542,059 | 9/1985 | Toganoh et al. | 428/141 |
| 4,571,267 | 2/1986 | Drawert et al. | 106/27 |
| 4,595,931 | 6/1986 | Toganoh et al. | 346/1.1 |
| 4,619,956 | 10/1986 | Susi | 524/87 |
| 4,680,235 | 7/1987 | Murakami et al. | 347/105 |
| 4,686,118 | 8/1987 | Arai et al. | 427/261 |
| 4,740,420 | 4/1988 | Akutsu et al. | 428/341 |
| 4,780,340 | 10/1988 | Takahashi et al. | 427/393.5 |
| 4,783,511 | 11/1988 | Schmid | 525/431 |
| 4,818,325 | 4/1989 | Hiraiwa et al. | 156/315 |
| 4,853,421 | 8/1989 | Hayes | 523/223 |
| 4,886,844 | 12/1989 | Hayes | 523/223 |
| 5,025,043 | 6/1991 | Smith | 523/326 |
| 5,085,698 | 2/1992 | Ma et al. | 106/20 |
| 5,095,058 | 3/1992 | Smith et al. | 524/238 |
| 5,104,730 | 4/1992 | Misuda et al. | 428/304.4 |
| 5,106,417 | 4/1992 | Hauser et al. | 106/20 |
| 5,109,053 | 4/1992 | Smith et al. | 524/514 |
| 5,109,054 | 4/1992 | Smith | 524/514 |
| 5,154,760 | 10/1992 | Miller, Jr. | 106/20 |
| 5,180,624 | 1/1993 | Kojima et al. | 428/211 |
| 5,221,297 | 6/1993 | Childress et al. | 55/13 |
| 5,221,334 | 6/1993 | Ma et al. | 106/20 D |
| 5,231,131 | 7/1993 | Chu et al. | 524/504 |
| 5,236,996 | 8/1993 | Smith | 524/608 |
| 5,320,897 | 6/1994 | Kondo et al. | 427/288 |
| 5,428,083 | 6/1995 | Smith et al. | 523/414 |

FOREIGN PATENT DOCUMENTS

| | | |
|---|---|---|
| 0 663 300 A1 | 7/1995 | European Pat. Off. . |
| 514633 | 3/1996 | European Pat. Off. . |
| 704560 | 3/1996 | European Pat. Off. . |
| 62-160274 | 7/1962 | Japan . |
| 52-053012 | 4/1977 | Japan . |
| 56-148586 | 11/1981 | Japan . |
| 60-259488 | 12/1985 | Japan . |
| 61-098580 | 5/1986 | Japan . |
| 61-172787 | 8/1986 | Japan . |
| 61-188183 | 8/1986 | Japan . |
| 61-189986 | 8/1986 | Japan . |
| 61-230978 | 10/1986 | Japan . |
| 62-140877 | 6/1987 | Japan . |
| 62-152779 | 7/1987 | Japan . |
| 62-176872 | 8/1987 | Japan . |
| 62-204989 | 9/1987 | Japan . |
| 62-231788 | 10/1987 | Japan . |
| 63-173678 | 7/1988 | Japan . |
| 01-229683 | 9/1989 | Japan . |
| 01-229684 | 9/1989 | Japan . |
| 01-237187 | 9/1989 | Japan . |
| 1-281981 | 11/1989 | Japan . |
| 04-332680 | 11/1992 | Japan . |
| 07-149037 | 6/1995 | Japan . |
| 07-242053 | 9/1995 | Japan . |
| 1177199 | 1/1970 | United Kingdom . |
| 1055676 | 1/1986 | United Kingdom . |

OTHER PUBLICATIONS

International Search Report dated Feb. 3, 1998 issued in PCT/US97/18555.

(List continued on next page.)

*Primary Examiner*—Melissa Bonner
*Attorney, Agent, or Firm*—Whyte Hirschboek Dudek SC

[57] ABSTRACT

Coating compositions for making ink jet recording media are disclosed which comprise a mixture of a binder composition comprising a non-cationic water-insoluble binder resin having a surface energy greater than 40 dyn/cm dissolved or dispersed in an alcoholic liquid medium or dispersed in an aqueous liquid medium, the liquid medium having a boiling point less than 150° C. and a viscosity up to 100 kpa:s at 25° C., and hydrophilic pigment particles having a number average particle size in the range from 1–25 microns and an oil absorption of at least 60 g oil/100 g particles, the composition having a pigment particle to binder resin weight ratio in the range from 0.5:1 to 3:1. A recording medium for ink jet printing is also described which may be made using this coating composition, along with a process for making it. A process for making a water-resistant color image on a support material using the described recording medium, along with the product obtainable by that process, is also disclosed. The color image has superior wear resistance and weatherability, making it well-suited for outdoor use.

20 Claims, No Drawings

OTHER PUBLICATIONS

Technical Literature regarding Micromid, 142 Ltl Polyamid Dispersion, Union Camp Corporation, Jul. 1995.
*Modern Plastics Encyclopedia Handbook* (McGraw Hill), 1994; "UV Stabilizer" by Pyong–Nae Son, pp. 119–120, no month.
Uni–rez Product Data, Union Camp Corporation, Jan. 1993.
"Novel WB Polyamide Dispersions: An Environmentally Better Choice" by Dr. Philip W. Hurd and Dr. Gerald W. Heebner, Adhesives Age, Jul. 1992.
Chapter 2 of *Oxidation Inhibition in Organic Materials* (CRC Press, 1990, J. Pospicil et al., Eds. pp. 29–162) entitled "Photo–Oxidation of Polymers and its Inhibition", by Francois Gugumus; no month.
"Silica Gels: Preparation and Properties" by Milton, E. Winyall, Applied Industrial Catalysis, vol. 3, Chapter 3, published by Academic Press, Inc., 1984, no month.
Technical Literature for Elvamide™, "Product and Properties Guide", DuPont, no date.
Technical Bulletin, General Plastics Corporation, Gental™, "Solutions Containing Nylon Resin", no date.

WATER RESISTANT INK JET RECORDING MEDIA TOPCOATS

BACKGROUND OF THE INVENTION

1. Field of the Invention

This invention relates to compositions that are useful as ink jet recording media topcoats, recording media for ink jet images, processes for making ink jet recording media, processes for recording images on ink jet recording media and images made by such processes.

2. Description of Related Art

Ink jet printers are a well known means for creating black and white and color images on a recording medium. The images are created by generating small droplets of ink which are propelled onto the recording medium. The ink generally contains a water-based dye or dispersed pigment and the recording medium is often paper, but may also be a coated polymeric film as in the case of transparencies for overhead projectors. Advantages with this type of printing include the ability to create high resolution full color images rapidly and in large formats using digitally generated and stored images. It is quiet and environmentally friendly and safe.

However, the prior art has had to deal with certain disadvantages in using conventional ink jet printers. The ink had to be absorbed as quickly as possible by the recording medium in order to allow the recording medium to be handled soon after the ink has been applied and yet the ink has to be prevented from diffusing or spreading too far through and into the recording medium. That disadvantage becomes acute when attempting to obtain photographic quality resolution.

A further disadvantage of the prior art methods of ink jet recording is that the image lacked water and abrasion resistance. These two defects, along with the lack of light-fastness of dyes commonly used in ink jet inks, have hindered the application of ink jet printing to products which require outdoor weatherability.

The lightfastness problem may be combated by printing with pigmented inks that contain fine dispersions of highly UV-resistant pigments. The most common method used in the industry to impart waterfastness is the application of overlaminates. This significantly increases the cost of the product, the process can be quite awkward, and delamination or pick-off from the base film may occur, especially when the print is applied to a non-planar surface such as the riveted side panels of a truck in the case of fleet graphics.

One reason for the lack of water-resistance of the prior art ink jet recording media is that most of the coatings applied to polymeric film are based upon water-soluble polymers such as poly(vinyl alcohol). Several of these water-soluble polymers may be crosslinked, but the absorptivity of the coatings suffers if the degree of crosslinking is too great. Even when crosslinked, these highly hydrophilic polymers are still swelled somewhat by water. For an indoor application like an overhead transparency where smudge resistance upon handling is the main issue, the swelling of the coating does not present a major problem. However, for outdoor applications exposure of a swellable coating to rain will result in fading due to liberation of the colorant and will likely also eventually cause the removal of the coating from the underlying polymeric film.

The lack of outdoor weatherability and other disadvantages observed in the prior art are overcome by this invention.

SUMMARY OF THE INVENTION

One aspect of this invention is a coating composition comprising a mixture of:

(a) a binder composition comprising a non-cationic water-insoluble binder resin having a surface energy greater than 40 dyn/cm dissolved or dispersed in an alcoholic liquid medium or dispersed in an aqueous liquid medium, the liquid medium having a boiling point less than 150° C. and a viscosity up to 100 kPa:s at 25° C., and (b) hydrophilic pigment particles having a number average particle size in the range from 1–25 microns and an oil absorption of at least 60 g oil/100 g particles, the composition having a pigment particle to binder resin weight ratio in the range from 0.5:1 to 3:1.

Another aspect of this invention is a process for making a recording medium for ink-jet printing comprising coating a support material with the above coating composition and the recording medium obtainable by that process.

Yet another aspect of this invention is a recording medium for ink-jet printing comprising a support material having a coating in an amount in the range from 8 to 24 g/m² support material comprising:

(a) a non-cationic water-insoluble binder resin having a surface energy greater than 40 dyn/cm and (b) hydrophilic pigment particles having a number average particle size in the range from 1–25 microns and an oil absorption of at least 60 g oil/110 g particles, wherein the pigment particle to binder resin ratio is in the range from 0.5:1 to 3:1.

Yet another aspect of this invention is a process for making a water-resistant color image on a support material comprising applying a pigmented ink-jet ink to the coated side of the above recording medium and another aspect of this invention is the support material having a color image obtainable by that process.

DETAILED DESCRIPTION OF THE INVENTION

1. Pigment particles

In this invention, the polymeric binder resins do not absorb a significant quantity of water, as water-resistance is one objective. Consequently, pigment particles with extensive pore structures are added to create porosity in the coating and capacity for holding the water and water-miscible components present in the ink.

If pigment particles are systematically added to a binder, eventually a point is reached at which there is no longer enough binder to fill all of the space between the pigment particles. This is the critical pigment volume concentration, CPVC (ref.—T. C. Patton, *Paint Flow and Pigment Dispersion*, 2nd ed., Wiley-Interscience, 1979), a key quantity well known to those skilled in the art. As the pigment-:binder ratio increases above the CPVC, the amount of void space in the coating increases. Thus, the coating must be above the CPVC in order to be absorptive if the binder is non-absorptive. The pigment particle to binder resin ratio in the coating compositions of this invention is in the range from 0.5:1 to 3:1, preferably from 0.8:1 to 2:1.

The main restriction upon pigments for this invention is that they have a large absorption capacity, as is commonly defined by their oil absorption value. It is preferred that the pigment have an oil absorption value greater than 60, such as greater than 150, more preferably greater than 250, and even more preferably greater than 300, g oil/100 g pigment particles. In a preferred embodiment, the oil absorption value correlates to a specific pore volume of at least 0.5, more preferably at least 1.0, even more preferably at least 1.5, cc/g. Generally, the higher the oil absorption, the more preferred the pigment. The method for measuring the oil absorption value is set forth in ASTM D281-31, which is incorporated herein by reference.

There are no other specific limitations on the pigment or other absorptive material employed in this invention. The use of many different absorptive inorganic pigments may be found in the paper coating literature. These materials include calcium carbonate, precipitated silica, fumed silica, silica gel, titanium dioxide, talc, alumina, boehmite, pseudo-boehmite (U.S. Pat. No. 5,104,730), aluminum hydroxide, basic magnesium carbonate, amorphous magnesium carbonate, polyaluminum chloride, and zinc oxide. Sol-gel coatings obtained by hydrolysis of alkoxides of silicon or aluminum are another class of materials suitable for use in this invention. Preferred materials are sometimes referred to as "flatting agents".

In one embodiment, the pigment particles comprise silica. The preferred pigment in this invention is silica. Examples of preferred pigments include Gasil HP220, HP39, and IJ45 (Crosfield Co., Joliet Ill.), and Syloid C812, W500 , 620, and LV-6 (W.R. Grace & Co.—Conn., Baltimore, Md.). A particularly preferred pigment is Syloid C812, which has an oil absorption value of 320 g oil/100 g pigment particles and an average particle size of 12 microns. In general, silicas with large particle size and narrow particle size distribution give coatings with more interparticle void space and better ink absorption.

A method for selectively producing high pore volume silica gel described in U.S. Pat. No. 3,959,174, which is incorporated herein by reference for its relevant disclosure, may be used to make hydrophilic pigment particles that are useful in practicing this invention. It describes a process for selectively producing a silica having a specific pore volume within the range of 1.2 to 3.0 cc/g using alkaline gelation, by the control of silicate concentration, the use of a desolubilizing substance such as ammonium hydroxide, sodium sulfate or other such salt to decrease the solubility of silica, and the concentration ratio of this desolubilizing agent to silica content. The silica concentration is maintained at 3 to 15 percent, the silica to desolubilizing agent ratio at 2 to 20 and the gelation pH at 10.6 to 11.2. The gelled silica is then aged, neutralized, filtered, optionally aged a second time and washed. For this invention, the preferred values are in the range from 8 to 12 percent, more preferably 10 percent, $SiO_2$ and the $SiO_2/NH_3$ ratio in the range from 4 to 8, more preferably 6. After washing and filtering and prior to reslurrying, the silica is dried. This may be oven drying or spray drying. This drying forms particle agglomerates of greater than 25 microns. The agglomerated silica is fed into a fluid energy mill, preferable of the micronizer or jet pulverizer type. When the particles are at a predetermined size within the range of about 1 to 25 microns, they exit from the mill and are collected.

The number average pigment particle size is in the range from 1 to 25, preferably 5 to 17, microns.

2. Binder Resin

The binder resins of this invention have surface energies greater than 40, preferably greater than 42, dyne/cm. As the surface energy of the coating increases, the spreading coefficient, which may be defined (ref.—S. Wu, *Polymer Interface and Adhesion*, Marcel Dekker, 1982) as the decrease in free energy as the surface is covered with a film of liquid, increases. Physically this means that the rate of ink spread on the substrate increases. The inventors observed that the increase in coating surface energy manifests itself in color print density increases due to greater spread, or "dot gain", of the jetted ink droplets on the surface and increases in the rate of ink absorption as the ink spreads more rapidly into the capillaries of the porous coating. Swift ink absorption not only allows one to handle a print as soon as it comes off the printer, but for some wide-format ink jet printers the ink must dry within a few seconds or it will be smeared by handling or by rollers in the paper feed systems that may be only a few inches away from the printhead.

The surface energy of a flat film of binder resin may be measured by ASTM D2578-94, which is incorporated herein by reference. This test employs mixtures of formamide and ethyl Cellosolve over the range of 30–56 dyn/cm. Test kits are available from Diversified Enterprises under the name AccuDyne Test Surface Tension Test Fluids.

(a) Alcohol-Soluble Binder Resins

In one preferred embodiment of this invention, the binder composition comprises a non-cationic alcohol-soluble water-insoluble binder resin dissolved in an alcoholic liquid medium. In that embodiment, the binder resin is preferably soluble to a concentration of at least 5 wt % in the alcohol or alcohol mixture used to prepare the recording media coating composition.

Alcoholic liquid medium has a boiling point less than 150° C., preferably less than 140° C., more preferably less than 120° C., and has a viscosity of up to 100 mPa:s, preferably up to 50 mPa:s. The alcohols are not a solvent for the polymeric support, although they may swell the support to some extent. Suitable alcohols include hydrocarbon compounds having at least one carbon atom and at least one hydroxy group. They can have a wide range of carbon atoms and hydroxy groups. Preferably, however, the alcohol has less than 15 carbon atoms and less than 4 hydroxy groups. These alcohols may have other hetero atoms besides those contributed by the hydroxy group(s) that are primary, secondary or tertiary to the hydrocarbon moiety as their valence allows so long as it does not become a solvent for the polymeric support.

Due to the polar nature of most binder resins, polar hydrocarbon liquids with hydroxyl groups are preferred alcoholic liquid media. Straight chain primary and secondary alcohols ranging from 1 to 6 carbon atoms in length, such as methanol, ethanol, propanol, n-butanol, 2-butanol, isopropanol, and so forth, are preferred. Tertiary alcohols such as diacetone alcohol are also appropriate. Glycol ethers such as diethylene glycol monobutyl ether, ethylene glycol monobutyl ether and propylene glycol monomethyl ether may also be included in the composition as alcoholic liquid media. The solvent composition of the coating composition may include up to 40 percent water and minor amounts of other organic solvents.

One preferred class of suitable alcohol-soluble binder resins are alcohol-soluble polyamides. Typical alcohol-soluble polyamides and methods of obtaining them are disclosed in U.S. Pat. Nos. 2,285,009; 2,320,088; 2,388,035; 2,393,972; 2,450,940 and 3,637,550, which are incorporated herein by reference for their relevant disclosure. Preferred alcohol-soluble polyamides include alcohol-soluble melt-polymerized polyamides consisting essentially of recurring carboxamido groups and at least two different species of recurring hydrocarbylene groups selected from the group consisting of aliphatic and alicyclic groups of 2 to 40 carbon atoms as integral parts of the main polymer chain, and having at least 3 different recurring polyamide repeat units.

Preferred among such polyamides are those in which (a) about 33–100 mole percent of the imine groups are derived from polymethylene diamine of 6 to 20 carbons, (b) about 5–65 mole percent of the carbonyl groups are derived from dimerized fatty acids of 16 to 48 carbon atoms, (c) about 8–65 mole percent of the carbonyl groups are derived from polymethylene diacid of 6 to 18 carbon atoms, and (d) about 8–65 mole percent of the carbonyl groups are derived from monomer selected from the group consisting of (1) polymethylene diacid of 6 to 18 carbon atoms which is different from diacid (c), and (2) polymethylene omega-aminoacid of 6 to 18 carbon atoms. These polyamides have an annealed heat of fusion of about 5 to 18 calories per gram, are quenchable to the amorphous state at a cooling rate of about 100° C. per minute, and have an upper glass transition temperature in the amorphous state of less than about 30° C.

A particularly preferred class of polyamides includes those in which (1) about 98–100 mole percent of the imine groups are derived from hexamethylene diamine, (b) about 15–55, and preferably 25–55, mole percent of the carbonyl groups are derived from dimerized fatty acid of 36 carbon atoms, (c) about 10–45, and preferably 15–45, mole percent of the carbonyl groups or derived from adipic acid, and (d) about 15–55, and preferably 15–45, mole percent of the carbonyl groups are derived from polymethylene diacid of 10 to 12 carbon atoms. Most preferably, these polyamides have a minimum flow temperature of about 160° to 210° C.

Suitable polymethylene diamines for preparing suitable polyamides include hexamethylene diamine, heptamethylene diamine, octamethylene diamine, nonamethylene diamine, decamethylene diamine, undecamethylene diamine, dodecamethylene diamine, tridecamethylene diamine, and octadecamethylene diamines. Suitable polymethylene diacids for preparing suitable polyamides include adipic, pimelic, suberic, azelaic, sebacic, dodecanedioic, brassylic, tetradecandioic and octadecanedioic acids. Suitable aminoacids include 6-aminocaproic, 7-aminoheptanoic, 8-aminocaprylic, 9-aminononanoic, 10-aminodecanoic, 11-aminoundecanoic, 17-aminoheptadecanoic, and the like.

By "dimerized fatty acid of 16 to 48 carbons" is meant dimers derived from fatty acids of 8 to 24 carbons. These dimerized fatty acids are commercially available materials which have been fully described in the literature including U.S. Pat. Nos. 3,157,681 and 3,256,304, which are incorporated herein by reference. These dimerized fatty acids are obtained by catalytic or non-catalytic polymerization of ethylenically unsaturated fatty acids.

The method of forming polyamides by melt-condensation is well known to those skilled in the art. This polymerization reaction is described, for example, in U.S. Pat. Nos. 2,252,554 and 2,285,009, which are incorporated herein by referece and British Patent 1,055,676. The reaction is carried out by polyamide-forming derivatives, and, if desired, aminoacids or their polyamide-forming derivatives at temperatures of about 150° to 300° C. while driving off water, and continuing the reaction until the desired molecular weight is obtained. The resulting polyamide will contain substantially equimolar amounts of carbonyl groups and imine groups. The polymer end groups will be carboxylic acid and amine, one of which may be in slight excess depending upon which reactant was present in excess. In accordance with this invention there should be at least as many amine ends as carboxyl ends.

These polyamides and how to make them are described in more detail in U.S. Pat. No. 3,637,550, which is incorporated herein by reference for its relevant description. Specific examples of this type of polyamides that are useful in this invention include Elvamide nylon terpolymer resins (E.I. DuPont de Nemours, Inc., Wilmington, Del.), Gental nylon terpolymer solutions (General Plastics Corp., Bloomfield, N.J.) and Arrochem NR 0923 and NR 1063 nylon terpolymer solutions (Arrochem, Inc., Mt. Holly, S.C.). Particularly preferred binder resins are solutions of Elvamide 8063 nylon terpolymer in blends of low molecular weight aliphatic alcohols and water, especially those available under the trade name Gental (General Plastics Corp).

Also included as preferred alcohol-soluble polyamides are those prepared by condensing a monocarboxylic acid, diamine and dimerized fatty acid, described in further detail in U.S. Reissue Pat. No. Re. 28,533, those prepared by condensing an acid component of dimerized fatty acids, at least one aliphatic unbranched monocarboxylic acid and at least one aliphatic branched monocarboxylic acid with ethylene diamine and hexamethylene diamine as the amine component described in further detail in U.S. Pat. No. 4,571,267, and those polyamide resin compositions that comprise the condensation reaction product of a $C_{36}$ dimerized fatty acid, at least one dibasic acid, at least one $C_1$–$C_4$ alkyl diamine and at least one piperazine-like diamine, the equivalents of amine groups being substantially equal to the equivalents of carboxyl groups, where 30 to 50 equivalent percent of the carboxyl groups are contributed by the dibasic acid component and 73 to 93 equivalent percent of the amine groups are contributed by the piperazine-like diamine component described in further detail in U.S. Pat. No. 5,154,760. Each of these U.S. Patents are incorporated herein by reference for their relevant description. Specific examples of this type of polyamide resin include the Uni-Rez fatty acid dimer-based polyamides (Union Camp Corp., Wayne, N.J.).

(b) Dispersed Binder Resins

In another preferred embodiment of this invention, the binder resin composition is a dispersion of a non-cationic water-insoluble binder resin in an aqueous or alcoholic liquid medium. The alcoholic medium may be selected from among those described above as solvents for the resins which are soluble in alcoholic liquid media. The aqueous or alcoholic medium may be a mxture of an alcoholic medium with an aqueous media, and it may further comprise minor amounts of non-alcoholic organic solvents.

In one preferred embodiment, the binder resin is an aqueous dispersion of a non-cationic water-insoluble polyamide. Aqueous polyamide dispersions that are useful in this invention include Genton nylon terpolymer dispersions (General Plastics Corp.) and Micromid fatty acid dimer-based polyamide dispersions (Union Camp Corp.).

Polyamides suitable for making aqueous dispersons include polymerized fatty acid polyamide resins which have been prepared so as to have a low acid and low amine number. The dispersion is typically prepared by heating the polyamide resin to a temperature at or above its melting point. The liquified polymerized fatty acid polyamide resin is then blended with a predetermined amount of water which is heated to a temperature such that the resulting blend will have a temperature above the melting point of the polyamide resin. A surfactant, which may be anionic, nonionic or cationic, preferably nonionic, and which will promote the emulsification of the polyamide resin in water, is included in the mixture. The resulting mixture is then subjected to sufficient comminuting forces to form an emulsion in which droplets of the polyamide resin have a volume average size distribution of about 20 microns or less in diameter and preferably 5 microns or less. The resulting emulsion is then cooled to a temperature below the melting point of the polyamide resin causing the emulsified droplets of the polyamide resin to solidify as finely divided particles which are dispersed uniformly through the aqueous phase. The resulting stable aqueous dispersions of the polymerized fatty acid polyamide resin are obtained. This type of binder resin composition is described in more detail in U.S. Pat. No. 5,109,054, which is incorporated herein by reference.

(c) Topcoat Additives

Additives may be added to the topcoat formulation to provide additional beneficial properties. Additional properties may be particularly preferred when the image-bearing recording media is exposed to environmental conditions that are deleterious to the integrity of the image.

One of those environmental conditions is exposure to short wavelength radiation, such as the ultraviolet radiation contained in sunlight. Ultraviolet radiation is known to cause photochemical damage to coatings and color images, such as structural damage and fading or darkening of colors. Additives which are known to protect against degradation by ultraviolet radiation are generally classified as UV absorbers, light stabilizers, and antioxidants.

Examples of UV absorbers include compounds classified as derivatives of hydroxybenzotriazole, hydroxybenzophenone, and triazines, such as hydroxyphenel-s-triazines. Specific examples include Tinuvin™ 1130 from Ciba Geigy (a mixture of poly(oxy-1,2 ethanediyl), α-(3-(3-(2H-benzotriazol-2-yl)-5-(1,1-dimethylethyl)-4-hydroxyphenyl)-1-oxopropyl)-ω-hydoxy and poly(oxy-1,2 ethanediyl), α-(3-(3-(2H-benzotriazol-2-yl)-5-(1,1-dimethylethyl)-4-hydroxyphenyl)-1-oxopropyl)-ω-(3-(3-(2H-benzotriazol-2-yl)-5-(1,1-dimenthylethyl)-4-hydroxyphenyl)-1-oxopropoxy); Cyasorb™ UV 24 from Cytec (a hydroxybenzophenone UV absorber); and Cyasorb™ UV1164 also from Cytec (a UV absorber of the substituted s-triazine class).

The UV stabilizers are typically hindered amine light stabilizers (HALS). Specific examples include Tinuvin™ 292 and 770 and Chimassorb™ 944FL, all from Ciba Geigy.

The antioxidants which are useful in the topcoat formulations of the present invention may be selected from a wide range of compounds, such as the phenolic antioxidants, e.g., hindered monophenols, diphenols, and polyphenols, and phosphites and phosphonites. Examples of the phenolic antioxidants include the Irganox™ series from Ciba Geigy, such as Irganox™ 1098, and an example of the phosphite type antioxidant is Ethanox™ 398 from Ethyl Corporation.

Further examples of UV absorbers, stabilizers and antioxidants that may be used as additives to the topcoat compositions according to this invention may be found in Chapter 2 of *Oxidation Inhibition in Organic Materials* (CRC Press, 1990, J. Pospicil et al., eds., pp. 29–162), entitled "Photo-oxidation of Polymers and its Inhibition" by Francois Gugumus; *Modern Plastics Encyclopedia Handbook* (McGraw Hill, 1994); "UV Stabilizer" by Pyong-Nae Son, pp. 119–120; European Patent Application 704,560; and U.S. Pat. Nos. 4,314,933 and 4,619,956, all of which are incorporated herein by reference.

Polyamide-based topcoats, when UV-stabilized with an additive package, have proven especially suitable for applications requiring outdoor weatherability in which a high degree of water-resistance is required. Additives appropriate to polyamides include hydroxybenzophenone and hydroxybenzotriazole UV absorbers, hindered amine light stabilizers, and phenolic and phosphite antioxidants. Best results are usually obtained when a combination of UV absorbers, hindered amines, and antioxidants are used.

An advantage of ink jet media with the polyamide-based topcoats of this invention relative to the prior art is that no overlamination, heating, exposure to UV light or an electron beam, or other post-treatment is required after printing. The polyamides may be coated either from solution in alcohols and alcohol/water mixtures or in the form of aqueous dispersions.

3. Supports

The coating compositions of this invention can be used on a variety of supports, including paper, polymer-coated paper, synthetic paper, vinyl (such as cast vinyl or calendared vinyl), polyethylene, polypropylene, polyester (such as polyethylene terephthalate), polystyrene, etc. The advantages of this invention are particularly pronounced with regard to supports having low surface energy, low porosity and/or a generally poor ability to absorb and adhere to ink jet inks. Supports that have good weatherability are preferred in those applications in which weatherability is a criterion.

The surface of a low surface energy support such as nearly any of the commercially manufactured polymer supports mentioned above, is often treated to raise its surface energy and provide polar groups which can hydrogen bond to attain good adhesion between the support and the binder. To render these support materials improved in adhesiveness, surface treating methods are known which comprise subjecting the substrates to flame treatment, corona discharge treatment, irradiation treatment or oxidizing treatment with a bichromate, sulfate or the like so as to produce polar groups such as a carbonyl group on the surface of the substrates. However, such treatments need special equipment and are complicated to carry out.

Another approach is to coat the support with a primer which comprises a polar polymer having a surface energy intermediate between that of the support and that of the coating composition. Acrylic polymers, polyurethane polymers and mixtures of acrylic and polyurethane polymers are preferred, particularly when they are in the form of an aqueous dispersion. A primer may be applied at low coat weights, such as in the range of 1 to 4 $g/m^2$ dry weight.

It is also known to employ certain chlorinated polymers as primers to enhance the bonding of materials to untreated polyolefin surfaces. Chlorinated mixtures of a hydrocarbon resin and polyethylene are taught in U.S. Pat. No. 4,070,421 for use as primers and paint and ink additives for improving adhesion of coatings to polyolefin. Chlorinating carboxyl-group-containing polyolefins to form primer coatings for untreated polyolefin substrates is taught in U.S. Pat. No. 3,579,485. U.S. Pat. No. 3,380,844 teaches the coating of polyolefin film by a polymer of vinylidene chloride, a (meth)acrylate ester and (meth)acrylic or itaconic acid. All the foregoing patents are incorporated herein by reference for their relevant disclosures.

Polymers other than chlorinated polymers have also been adhered to polyolefins. U.S. Pat. No. 4,080,405 teaches a process for chemical modification of polyolefins by grafting polar monomers onto the polyolefin by means of a free radical generating material to produce a polyolefin surface having improved wettability. U.S. Pat. No. 3,394,029 teaches the coating of polyolefin surfaces by polymers of certain terpene acrylates and N-terpene acrylamides for improved adhesion of conventional lacquer topcoats. U.S. Pat. No. 4,014,645 teaches the enhancement of dye receptivity of polyolefin materials used in fabric manufacture by coating the polyolefin with a self-curing polymeric binder containing a quaternary ammonium salt. U.S. Pat. No. 4,097,677 discloses certain radiation curable coatings, useful to coat some polyolefins; the coatings comprising monomeric unsaturated esters of glycol monodicyclopentenyl ethers. In British Patent. 1,177,199, nonwoven webs are disclosed containing a major amount of polypropylene fibers bonded with binder comprising vinyl acetate, ethylene and an unsaturated N-methylol amide or an alkyl ether thereof. U.S. Pat. No. 3,258,443 describes a latex which may be used to deposit a pressure-sensitive adhesive on polyethylene and polypropylene. The latex is prepared from 1 to 45% vinyl acetate, 50 to 98% of an alkyl acrylate having an alkyl group of between 4 and 10 carbon atoms (several acyclic alkyl groups are named) and 1 to 5% of an unsaturated carboxylic acid. Two patents to Baatz et al., U.S. Pat. Nos. 3,931,087 and 4,012,560, teach the use of copolymers of a sulfonic acid and esters of acrylic or methacrylic acids as pressure sensitive adhesives which are adherent to a number of surfaces including polyethylene and polypropylene. Each of the foregoing patents is incorporated herein by reference.

U. S. Pat. No. 4,818,325, incorporated herein by reference, describes a useful primer which comprises at least one organometallic compound and at least one organic polymer and is used in bonding non-polar or highly crystalline resin substrates together or bonding another material to the resin substrate with the use of a 2-cyanoacrylate.

Polyurethane resins may also be used as primers. The polyurethane resins include thermoplastic polyurethane resins and thermosetting polyurethane resins. In addition, the polyurethane resins include modified polyurethane resins as far as it mainly comprises polyurethane resins. However, in order to give a high adhesive capacity and a high elasticity to a paint film, thermoplastic polyurethane resins having a mean molecular weight (Mn) of 2,000 to 10,000, preferably 4,000 to 7,000, are used. Such resins are described in U.S. Pat. No. 4,780,340 for making additional primers.

4. Advantages and Uses

Superior printed color densities and ink absorption rates are obtainable for the recording media topcoat formulations according to this invention, along with improved weatherability.

This invention provides a significant improvement in the weatherability of the recorded image over that achieved by the prior art. The image, for example, passes the water immersion test. The water immersion test is conducted as follows:

(1) Create an ink jet image on the recording medium to be tested, allowing the image to dry to the touch;
(2) Immerse the image-bearing recording medium in deionized water at room temperature (about 25° C.) for 168 hours; and
(3) Remove the recording medium from the water and test abrasion resistance by rubbing a finger over the surface of the image. If the image is not destroyed or smeared by the abrasion, it passes.

Commercially available recording media have failed this test.

The invention also provides for images with high resolution and color density. The optical color density of images recorded on the recording media of this invention are typically 1.0 or greater when measured on, for example, Macbeth RD 1255 Color Checker densitometer.

The recording media of this invention may be used with a variety of ink jet inks and ink jet printing systems. Ink jet colorants are conventionally water-based dyes, but a number of pigmented inks have recently been introduced. They are described in U.S. Pat. Nos. 5,085,698; 5,106,417; 5,221,334; and 5,231,131, which are incorporated herein by reference. Pigmented inks are commercially available from duPont for Hewlett Packard and Encad Novajet ink jet printers. The pigmented inks are preferred for use with this invention due to their superior UV fading and weathering resistance relative to the dye-based inks.

5. Illustrative Examples

The following examples of coating formulations are given as specific illustrations of the invention. It should be understood, however, that the specific details set forth in the examples are merely illustrative and should in no way be construed to limit the invention. All parts in the foregoing specifications are by weight unless otherwise specified.

EXAMPLE 1

This example of the invention shows the preparation of an outdoor weatherable coated vinyl as an ink jet printable substrate. In order to improve the adhesion of the coating to the vinyl substrate, a primer coat was employed.

Primer Formulation A:

| Component | Weight (g) |
| --- | --- |
| Joncryl 617 | 50 |
| Neorex R-972 | 50 |

Joncryl 617 is a S. C. Johnson and Co. trademark for a styrenated acrylic latex.
Neorez R-972 is a trademark of Bayer for a colloidal, aqueous dispersion of an aliphatic polyurethane.

A calendered white vinyl substrate with a polymeric, non-migratory plasticizer (Intex) coated with a pressure sensitive adhesive and mounted on a paper liner was coated with primer formulation A using a #5 wire wound rod and dried in a forced air oven at 38 C for 1 minute.

A coating formulation with an alcohol-soluble, water-insoluble polyamide was made with the following composition according to the procedure detailed below:

| Component | Weight (g) |
| --- | --- |
| Gental 102 | 424.4 |
| Syloid C812 | 92.9 |
| ethanol | 278.8 |
| deionized water | 92.9 |
| Tinuvin 1130 | 8.9 |
| Tinuvin 770 | 8.9 |
| Irganox 1098 | 5.3 |
| n-butanol | 87.9 |

Gental 102 is a trademark of General Plastics for an alcohol-water solution of a nylon terpolymer resin.
Syloid C812 is a trademark of W. R. Grace & Co. - Conn. for a specific silica gel.
Tinuvin 1130 is a trademark of Ciba-Geigy Corp. for a substituted hydroxyphenyl benzotriazole UV absorber.
Tinuvin 770 is a trademark of Ciba-Geigy Corp. for a hindered amine light stabilizer.
Irganox 1098 is a trademark of Ciba-Geigy Corp. for a high molecular weight, multifunctional, nitrogen-containing, hindered phenolic antioxidant.

Syloid C812 silica was dispersed in ethanol and deionized water with a high-speed mixer. Gental 102 polyamide solution was then added and the components were mixed until homogenized. A UV stabilization package consisting of a benzotriazole UV absorber (Tinuvin 1130), hindered amine light stabilizer (Tinuvin 770), and a phenolic antioxidant (Irganox 1098) was dissolved in n-butanol and subsequently added and stirred in. Generally, it was observed that UV stabilization additive packages containing UV absorbers, hindered amines, and antioxidants in combination gave much better resistance to radiation damage than any of those components employed singly.

The coating formulation was drawn down on the primed vinyl substrate with a #42 wire wound rod and dried using a forced air oven at 38° C. for 1 minute. When printed with a Brady COLORPIX™ color production system (a wide format ink jet printing system) using the system's pigmented outdoor ink the resulting images were bright and crisp and the scratch-resistance of the coating was good in both printed and unprinted areas. The printed and unprinted samples showed no effects after 200 hr in a Atlas Xenon-Arc Weatherometer with intermittent water spray according to SAE J1960 testing protocol. Printed samples were also immersed for six weeks in water with no degradation of the images. Therefore, the objective of developing a waterfast and UV-resistant ink-substrate system is attained when a coating from Formulation 1 is printed with a pigmented, UV-resistant ink.

EXAMPLE 2

In this formulation a small amount of a polyurethane resin is included to modify the properties of the polyamide-based topcoat.

| Component | Weight (g) |
| --- | --- |
| NR 0923 | 81.82 |
| Syloid C812 silica | 9.82 |
| isopropanol | 6.13 |
| toluene | 1.31 |
| Desmolac 4200 | 0.92 |

NR 0923 is a polyamide terpolymer solution in an alcohol-water mixture available from Arrochem, Inc.
Desmolac 4200 is a trademark of Zeneca for an aliphatic polyurethane.

Desmolac 4200 was added to the toluene and 3.93 g of isopropanol and dissolved on a heated stir-plate. This mixture and the remaining 2.20 g of isopropanol were subsequently added to the NR 0923 polyamide solution, and the silica was stirred in slowly to avoid clumping. The coating formulation was drawn down on a sheet of primed vinyl (see Example 1 for details of the primer formulation and coating methodology) with a #60 wire wound rod and air-dried. The coated vinyl was then printed on the Brady COLORPIX™ color production system with the system's pigmented inks. The printed color density and clarity were excellent, and the presence of the polyurethane resulted in increases in adhesion and scratch-resistance.

EXAMPLE 3

In this example two different types of polyamide resins were combined according to the following formulation:

| Component | Weight (g) |
| --- | --- |
| NR 0923 | 72.72 |
| Uni-Rez 2228 | 1.62 |
| Syloid C812 silica | 9.82 |
| isopropanol | 15.82 |

Uni-Rez 2228 is a trademark of Union Camp Corp. for a fatty acid dimer-based polyamide resin.

Uni-Rez 2228 was dissolved in isopropanol and then added to the NR 0923 polyamide solution. The C812 silica was added slowly and incorporated into the formulation with an overhead mixer. A #60 wire wound rod was used to draw down the coating formulation on primed vinyl (see example 1 for details of the primer formulation and coating methodology). After drying in ambient air, the substrate was printed on the Brady COLORPIX™ color production system with the system's pigmented inks. The printed images were bright and exhibited excellent resolution of features.

EXAMPLE 4

The use of polyamide dispersions in the invention is illustrated in the following formulation:

| Component | Weight (g) |
| --- | --- |
| Genton 310 | 54.54 |
| Syloid LV-6 silica | 6.55 |
| deionized water | 37.09 |
| isopropanol | 1.82 |

Genton 310 is a trademark of General Plastics Corp. for an aqueous dispersion of a nylon terpolymer.
Syloid LV-6 is a trademark of W. R. Grace & Co. - Conn. for a specific silica gel.

Syloid LV-6 silica was dispersed in deionized water and isopropanol with an overhead mixer. This slurry was then slowly added to the Genton 310 as the mixture was stirred slowly, as Gental 310 is somewhat shear-sensitive. The mixture was drawn down onto a 5 mil white polyester film with a #60 wire wound rod and air dried. When printed on the Brady COLORPIX™ color production system using the system's pigmented inks, images showed excellent clarity and good color densities.

Although the invention has been described in considerable detail through the preceding specific embodiments, it is to be understood that these embodiments are for purpose of illustration only. Many variations and modifications can be made by one skilled in the art without departing from the spirit and scope of the invention.

What is claimed is:

1. A process for making a recording medium for ink-jet printing comprising coating a synthetic polymer or film with a coating composition comprising a mixture of:
   (a) a binder composition comprising a non-cationic water-insoluble polyamide binder resin having a surface energy greater than 40 dyn/cm dissolved or dispersed in an alcoholic medium, the liquid medium having a boiling point less than 150° C. and a viscosity up to 100 kpa:s at 25° C. and
   (b) hydrophilic pigment particles comprising silica, the particles having a number average particle size in the range from 4–25 microns and an oil absorption of at least 150 g oil/100 g particles,
   the binder composition having a pigment particle to binder resin ratio in the range from 0.8:1 to 2:1.

2. The process as defined in claim 1, wherein the synthetic polymer film or sheet has been treated on the surface to be coated with a polar polymer.

3. The process as defined in claim 1, wherein the recording medium produced by the process has from 8 to 24 g dried coating/m$^2$.

4. The process as defined in claim 1, wherein the thickness of the coating is in the range from 10 to 50 microns.

5. A recording medium for ink-jet printing obtainable by the process of claim 1.

6. A recording medium for ink-jet printing comprising a synthetic polymer film or sheet having a coating in an amount in the range from 8 to 24 g/m$^2$ comprising:
   (a) a binder composition comprising a non-cationic water-insoluble polyamide binder resin having a surface energy greater than 40 dyn/cm dissolved or dispersed in an alcoholic medium, the liquid medium having a boiling point less than 150° C. and a viscosity up to 100 kpa:s at 25° C. and
   (b) hydrophilic pigment particles comprising silica, the particles having a number average particle size in the range from 4–25 microns and an oil absorption of at least 150 g oil/100 g particles,
   the binder composition having a pigment particle to binder resin ratio in the range from 0.8:1 to 2:1.

7. The recording medium according to claim 6, wherein the synthetic polymer flit or sheet has a primer coating enhancing adhesion of the binder resin to the synthetic polymer film or sheet.

8. The recording medium according to claim 6, wherein non-cationic water-insoluble polyamide resin is an alcohol-soluble polyamide consisting essentially of recurring carboxamide groups and at least two different species of recurring hydrocarbylene groups selected from the group consisting of aliphatic and alicyclic groups of 2 to 40 carbon atoms as integral parts of the main polymer chain, and having at least 3 different recurring polyamide repeat units.

9. The recording medium according to claim 6, wherein the polyamide is the product of a condensation reaction between at least one dimerized fatty acid and at least one diamine.

10. A process for making a water-resistant color image on a support material comprising applying a pigmented ink-jet ink to the coated side of the recording medium of claim 6.

11. A support material having a color image obtainable by the process of claim 10.

12. The process according to claims 1, wherein the polyamide binder resin is an alcohol-soluble water-insoluble polyamide consisting essentially of recurring carboxamide groups and at least two different species of recurring hydrocarbylene groups selected from the group consisting of aliphatic and alicyclic groups of 2 to 40 carbon atoms as integral parts of the main polymer chain, and having at least 3 different recurring polyamide repeat units.

13. The process according to claim 1, wherein the pigment particles are silica particles having a specific pore volume in the range from 1.2 to 3.0 $cm^3/g$.

14. The process according to claim 1, wherein the pigment particles have a number average particle size in the range from 5–17 microns.

15. The process according to claim 1, wherein the binder composition further comprises an ultraviolet light absorber, a hindered amine light stabilizer or an antioxidant, or a combination thereof.

16. The process according to claim 1, wherein the polyamide binder resin is an alcohol-soluble water-insoluble polyamide consisting essentially of recurring carboxamide groups and at least two different species of recurring hydrocarbylene groups selected from the group consisting of aliphatic and alicyclic groups of 2 to 40 carbon atoms as integral parts of the main polymer chain, and having at least 3 different recurring polyamide repeat units, and the pigment particles are silica particles having a specific pore volume in the range from 1.2 to 3.0 $cm^3/g$ and a number average particle size in the range from 5–17 microns.

17. The recording medium according to claim 4, wherein the pigment particles are silica particles having a specific pore volume in the range from 1.2 to 3.0 $cm^3/g$.

18. The recording medium according to claim 6, wherein the pigment particles have a number average particle size in the range from 5–17 microns.

19. The recording medium according to claim 6, wherein the binder composition further comprises an ultraviolet light absorber, a hindered amine light stabilizer or an antioxidant, or a combination thereof.

20. The recording medium according to claim 6, wherein the polyamide binder resin is an alcohol-soluble water-insoluble polyamide consisting essentially of recurring carboxamide groups and at least two different species of recurring hydrocarbylene groups selected from the group consisting of aliphatic and alicyclic groups of 2 to 40 carbon atoms as integral parts of the main polymer chain, and having at least 3 different recurring polyamide repeat units, and the pigment particles are silica particles having a specific pore volume in the range from 1.2 to 3.0 $cm^3/g$ and a number average particle size in the range from 5–17 microns.

* * * * *